(12) United States Patent
Chen et al.

(10) Patent No.: US 6,703,597 B2
(45) Date of Patent: Mar. 9, 2004

(54) METHOD FOR RESOLVING PHOTOELECTRON COUPLING IN STAGGERED CHARGE-COUPLED DEVICE

(75) Inventors: Shih-Huang Chen, Hsinchu (TW); Shih-Zheng Kuo, Taipei Hsien (TW)

(73) Assignee: UMAX Data Systems, Inc., Hsinchu (TW)

( * ) Notice: Subject to any disclaimer, the term of this patent is extended or adjusted under 35 U.S.C. 154(b) by 221 days.

(21) Appl. No.: 10/005,286

(22) Filed: Dec. 4, 2001

(65) Prior Publication Data

US 2003/0102423 A1 Jun. 5, 2003

(51) Int. Cl.[7] .......................... H04N 3/14; H04N 5/335; H01L 27/00

(52) U.S. Cl. ................... 250/208.1; 358/483; 348/275; 348/315

(58) Field of Search .................. 250/208.1, 208.2, 250/208.3, 214 R, 226, 214 C; 358/474, 483, 505, 513; 348/275, 298, 311, 315

(56) References Cited

U.S. PATENT DOCUMENTS

| 6,608,301 B2 | * | 8/2003 | Liu et al. | 250/234 |
| 2002/0054230 A1 | * | 5/2002 | Chen | 348/316 |
| 2002/0093694 A1 | * | 7/2002 | Spears | 358/474 |

* cited by examiner

*Primary Examiner*—Kevin Pyo
(74) *Attorney, Agent, or Firm*—J. C. Patents

(57) ABSTRACT

A method of resolving photoelectron coupling that results from the operation of a staggered charge-coupled device inside a scanner. The staggered charge-coupled device at least includes an optical sensor group comprising of an optical sensor array and a neighboring optical sensor array for scanning pixels. The method includes the step of: recording the quantity of photoelectrons transferred between a first quantity of photoelectrons captured by the optical sensor array and a second quantity of photoelectrons captured by the neighboring optical sensor array during a scanning time interval t. Thereafter, the quantity of transferred photoelectrons is subtracted from the first quantity of photoelectrons captured by the optical sensor array to obtain the correct quantity of photoelectrons captured by the optical sensor array during the scanning time interval t. Using the corrected value, accurate brightness value of the pixels scanned by the optical sensor array is obtained.

5 Claims, 3 Drawing Sheets

METHOD FOR RESOLVING PHOTOELECTRON COUPLING IN STAGGERED CHARGE-COUPLED DEVICE

BACKGROUND OF THE INVENTION

1. Field of Invention

The present invention relates to a method of resolving photoelectron coupling. More particularly, the present invention relates to a method of resolving photoelectron coupling resulting from the operation of a staggered charge-coupled device inside a scanner.

2. Description of Related Art

The optical sensors used by scanners can be divided into linear optical sensors such as linear charge-coupled device (linear CCD) or subsequently developed staggered optical sensors such as staggered charge-coupled device (staggered CCD).

FIG. 1 is a schematic diagram showing the layout of a conventional staggered charge-coupled device. As shown in FIG. 1, each group of optical sensors in the staggered CCD includes a pair of linear optical sensor arrays, often referred to as an odd optical sensor array and an even optical sensor array. These two rows of optical sensor arrays have a line separation of M pixels. Since a color scanner needs to process the three primary colors, namely, red (R), green (G) and blue (B), there are three sets of optical sensor groups. Because the effect and method of operation for each optical sensor group are identical, the operation of only one of the optical sensor groups—the one for processing red color, is selected in the following illustration.

When an even optical sensor array 124 processes the $n^{th}$ row of pixels of a document 100, the even pixels such as 2, 4, 6 and 8 are extracted. Similarly, when the odd optical sensor array 122 processes the $n^{th}$ row of pixels, the odd pixels such as 1, 3, 5 and 7 are extracted. After the odd optical sensor array 122 has finished extracting the $n^{th}$ row of pixels, a processing circuit 146 outputs the extracted pixels of the two rows of optical sensor arrays in sequence. Ultimately, the $n^{th}$ row of pixel data is output as a data series 102 for processing by a later stage circuit.

However, as the odd optical sensor array 122 processes the $n^{th}$ row of pixels of the document 100 and because the odd and the even optical sensor arrays have a line separation of M pixels, the even optical sensor array 124 will scan the $(n+M)^{th}$ row of pixels. If a scan document (the document 100 in FIG. 1) has darker and lighter regions as shown in FIG. 1, the even optical sensor array 124 and the odd optical sensor array 122 will capture the $(n+M)^{th}$ row and the $n^{th}$ row of pixels during a scanning period t. Since the even optical sensor array 124 scans a strip of the document in the lighter region, the number of photoelectrons absorbed is larger. Because of this, the odd optical sensor array 122 scanning the darker region of the document may absorb some of the photoelectrons captured by the even optical sensor array 124 and lead to a whitening of the darker region. In other words, the original black color region becomes a gray color region and hence the scanning operation produces undesirable image distortions. Using the data series 102 as an example, the sequential output pixel data will result in alternating gray, black, gray, black . . . instead of a uniform blackness with the identical brightness level of the original image.

On the other hand, because a portion of the image captured by the even optical sensor array 124 is lost to the odd optical sensor array 122, the colors of the $(n+M)^{th}$ row of pixels captured by the even optical sensor array 124 may also be distorted.

Hence, the two rows of optical sensor arrays affect each other leading to a partial coupling of the photoelectrons captured by the odd optical sensor array 122 and the photoelectrons captured by the even optical sensor array 124. Unless the staggered CCD of a scanner is modified in some ways, color distortion is bound to be present.

Conventionally, the only method of resolving the coupling in a staggered CCD is to average out the first pixel brightness value and the second pixel brightness value of the data series 102. In other words, the brightness value of the even pixel and the odd pixel are averaged to produce the color brightness value of the $n^{th}$ row of pixels.

However, with this type of averaging, true color of the original color is hidden. In effect, the arrangement lowers the genuine color brightness level of even pixels and raises the genuine color brightness level of the odd pixels.

SUMMARY OF THE INVENTION

Accordingly, one object of the present invention is to provide a method of resolving photoelectron coupling resulting from operating a staggered charge-coupled device inside a scanner so that color distortion is minimized. In addition, this method also provides an effect means of calibrating color brightness level.

To achieve these and other advantages and in accordance with the purpose of the invention, as embodied and broadly described herein, the invention provides a method of resolving photoelectron coupling of a staggered charge-coupled device. During a scanning period t, the amount of photoelectrons transferred between the batch of photoelectrons captured by exposing an optical sensor array and the batch of photoelectrons captured by exposing a neighboring optical sensor array is measured. Thereafter, the amount of transferred photoelectrons is subtracted from the batch of photoelectrons captured by exposing the optical sensor to find a more accurate number of photoelectrons captured by the optical sensor in the period t for use as the brightness value.

Through a relatively simple computation, additional photoelectrons from a neighboring optical sensor array captured by the optical sensor array or photoelectrons originally captured by the optical sensor array but transferred to the neighboring optical sensor array can be found so that a correct brightness value for an image is always secured.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
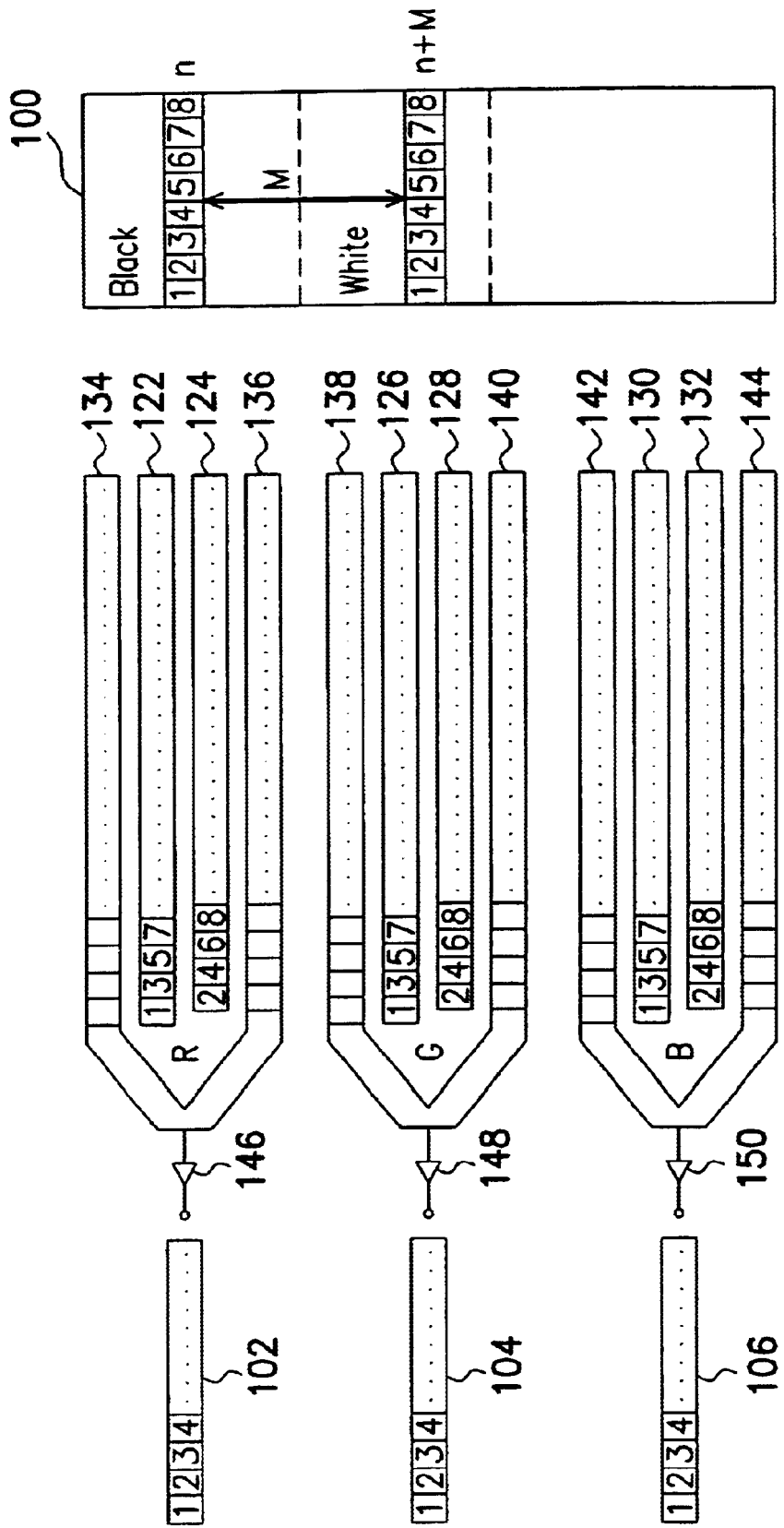
FIG. 1 is a schematic diagram showing the layout of a conventional staggered charge-coupled device.

Reference will now be made in detail to the present preferred embodiments of the invention, examples of which are illustrated in the accompanying drawings. Wherever possible, the same reference numbers are used in the drawings and the description to refer to the same or like parts.

Please refer to all three diagrams 1, 2, and 3, a method of resolving photoelectron coupling resulting from the operation of a staggered charge-coupled device according to the first embodiment of the present invention is used to correct the problem of the staggered charge-coupled device (staggered CCD).

As shown in FIG. 1, the staggered optical sensor includes at least a set of optical sensor groups such as a set of optical sensor groups for detecting a primary color, red (R). Furthermore, each optical sensor group includes an optical sensor array 122 and a neighboring optical sensor array 124. In other words, each optical sensor group comprises of an odd optical sensor array 122 and an even optical sensor array 124 next to the odd optical sensor array 122.

One major problem for the staggered CCD is that the two rows of optical sensors in each set of optical sensor group interact with each other. The odd optical sensor array 122 couples with a portion of the photoelectrons captured by the even optical sensor array 124 during exposure leading to color distortion. If the odd optical sensor array is separated from the even optical sensor array by M pixels, the even optical sensor array 124 will start to capture the $(n+M)^{th}$ row of even pixels when the odd optical sensor array captures the $n^{th}$ row of odd pixels during a time interval t. Ultimately, some mechanism must be implemented to re-calibrate the color brightness of the $n^{th}$ odd pixels captured by the odd optical sensor array 122 and the $(n+M)^{th}$ even pixels captured by the even sensor array 124.

Figure 2:
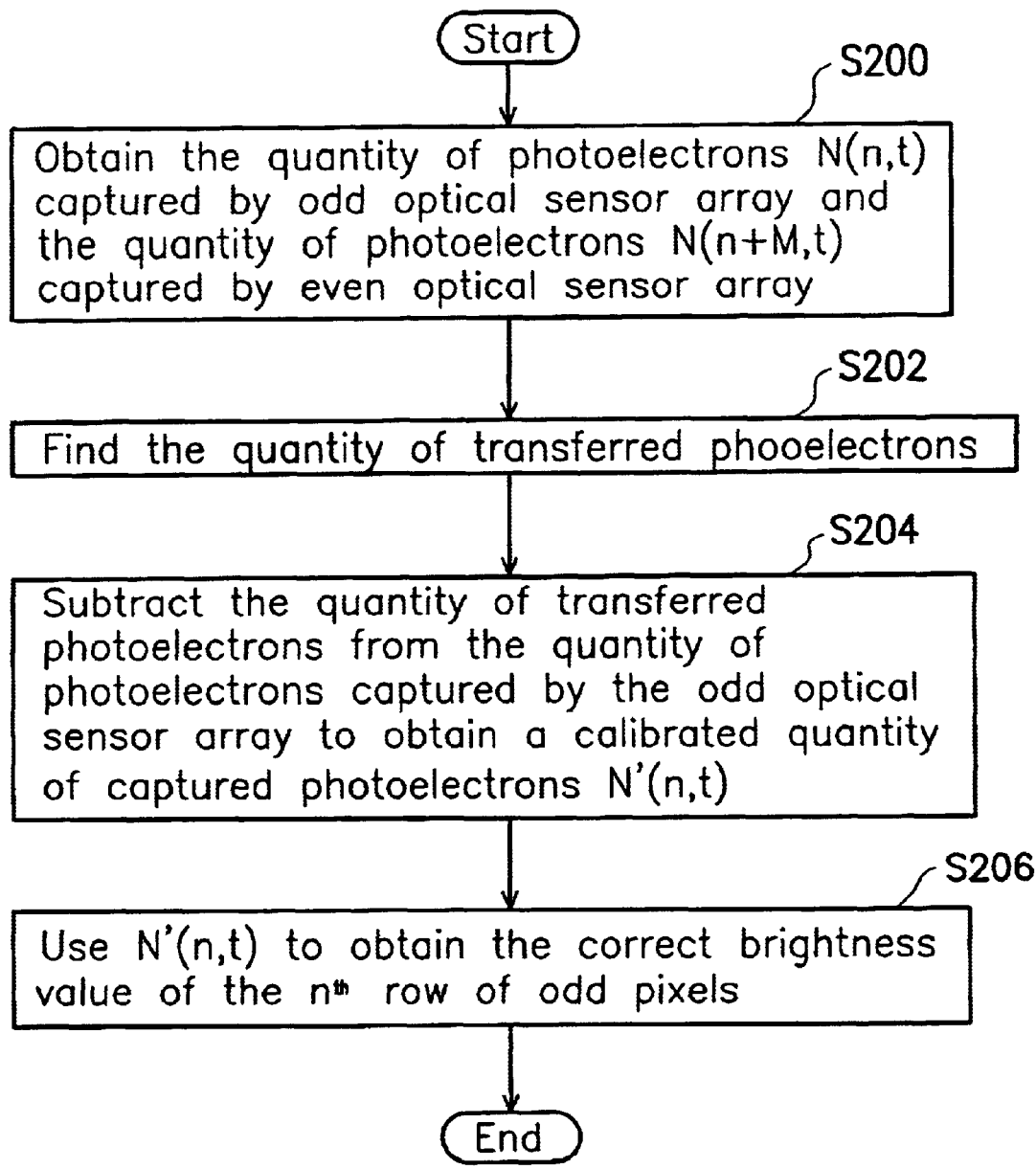
FIG. 2 is a flow chart showing the steps for resolving photoelectron coupling of the staggered charge-coupled device according to this invention.

The steps for resolving photoelectron coupling are listed out is FIG. 2. In step s200, the amount of photoelectrons of odd pixels in the $n^{th}$ row captured by the odd optical sensor array 122 and the amount of photoelectrons of even pixels in the $(n+M)^{th}$ row captured by the even optical sensor array 124 due to exposure in a scanning time interval t are measured. In step s202, the overall flow of photoelectrons between the captured photoelectrons inside the odd optical sensor array 122 and the captured photoelectrons inside the neighboring or even optical sensor array 124 are also measured.

Assume N(n,t) is a function for the odd optical sensor array 122 to capture the photoelectrons of odd pixels in the $n^{th}$ row during exposure in a scanning time interval t and N(n+M,t) is a function for the even optical sensor array 124 to capture the photoelectrons of even pixels in the $(n+M)^{th}$ row during exposure in the same scanning time interval t.

Figure 3:
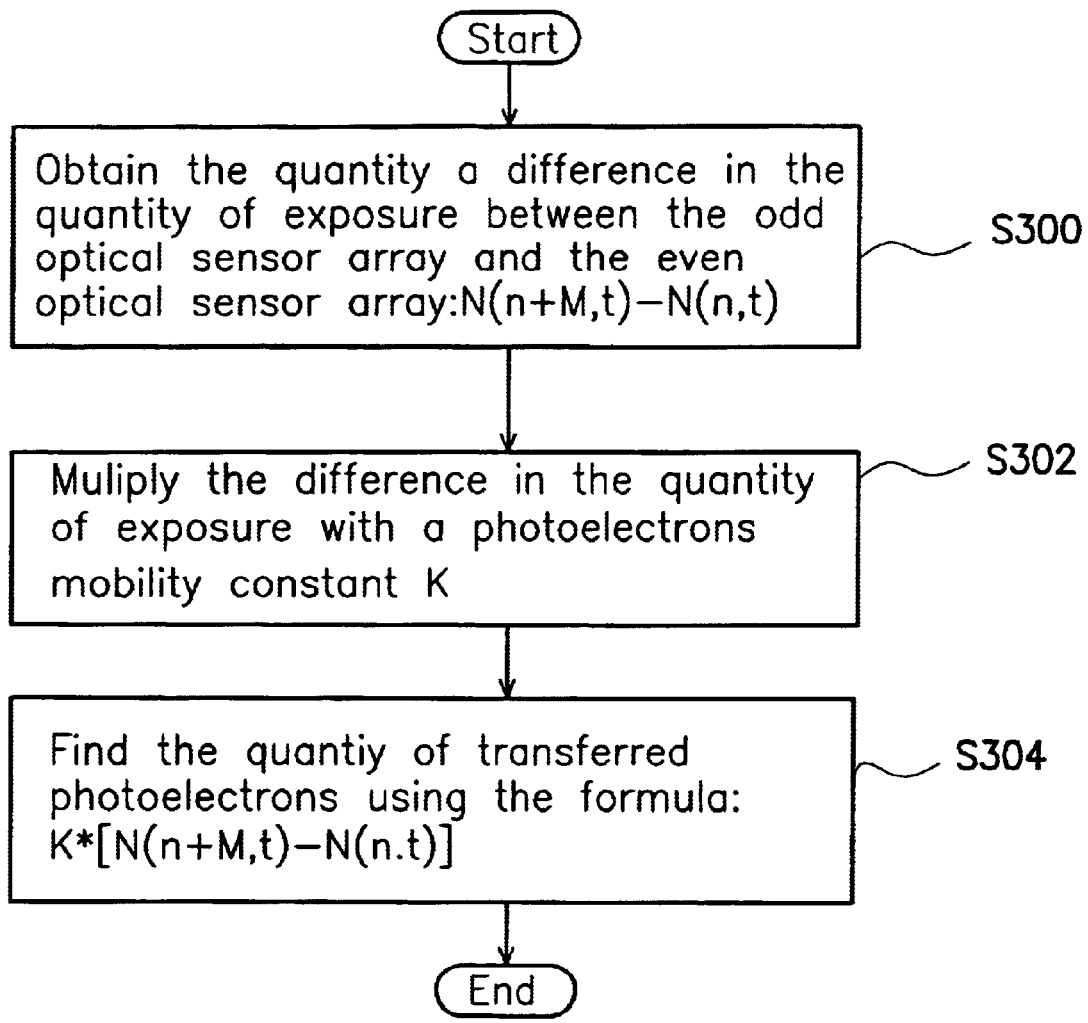
FIG. 3 is a flow chart showing the steps for finding the quantity of photoelectrons transferred between an odd optical sensor array and an even optical sensor array according to this invention.

The steps for measuring the overall amount of photoelectrons that moves between the odd optical sensor array and the even optical sensor array are listed out in FIG. 3. In step s300, the difference between the amount of photoelectrons captured by the odd optical sensor array 122 and the even optical sensor array 124 during a scanning time interval t is measured and is given by N(n+M,t)−N(n,t).

In step s302, the exposure difference and a photoelectron mobility constant K are multiplied together so that the overall quantity of photoelectrons transferred between the odd optical sensor array 122 and the even optical sensor array 124 during a scanning time interval t is found in step s304 as K*[N(n+M,t)−N(n,t)].

In step s204 of FIG. 2, the quantity of photoelectrons transferred is subtracted from the amount of photoelectrons of odd pixel captured in the $n^{th}$ row by the odd optical sensor array 122 during exposure to obtain a corrected quantity N'(n,t) of photoelectrons of odd pixels in the $n^{th}$ row. Hence, the value of N'(n,t) is N(n,t)−K*[N(n+M,t)−N(n,t)]. The photoelectron exposure value N'(n,t) is used in step s206 to calibrate the color brightness of the $n^{th}$ odd pixels.

The photoelectron mobility constant K is a percentage ratio of the photoelectrons captured by the odd optical sensor array 124 from the even optical sensor array 124 when the even optical sensor array 124 is exposed to capture photoelectrons.

Since a portion of the photoelectrons of the $(n+M)^{th}$ row of even pixels captured by the even optical sensor array 124 is lost, the brightness level of the $(n+M)^{th}$ row of even pixels must be re-calibrated. The method of calibration is similar to the method carried out for calibrating the photoelectrons of even pixels in the $n^{th}$ row captured by the odd optical sensor array 122. To calibrate the quantity of photoelectrons captured by the even optical sensor array 124, if the row of pixels to be calibrated is the $n^{th}$ row of pixels, the quantity of photoelectrons captured by the odd optical sensor array is in the $(n-M)^{th}$ row of even pixel. Accordingly, the value for calibrating the quantity of photoelectrons of even pixel in the $n^{th}$ row captured by the even optical sensor array 124 is N'(n,t)=N(n,t)−K*[N(n−M,t)−N(n,t)], where the quantity of photoelectrons transferred is given by K*[N(n−M,t)−N(n,t)] and K is still the photoelectron mobility constant. However, the even optical sensor array 124 loses a certain percentage of the captured photoelectrons.

In the aforementioned embodiment, the odd optical sensor array 122 captures the odd pixels in the darker region of a document 100 while the even optical sensor array 124 captures the even pixels in the lighter region of the document 100. Therefore, the even optical sensor array 124 will capture a quantity of photoelectrons higher than the odd optical sensor array 122. This may lead to the lost of a portion of the photoelectrons captured by the even optical sensor array 124 to the odd optical sensor array 122. Hence, the quantity of photoelectrons actually captured by the even optical sensor array 124 is lower than the quantity of photoelectrons that ought to be captured by the even optical sensor array 124. Conversely, the quantity of photoelectrons actually captured by the odd optical sensor array 122 is higher than the quantity of photoelectrons that ought to be captured by the odd optical sensor array 122.

On the contrary, the odd optical sensor array 122 may be set to capture the odd pixels in the lighter region of the document 100 while the even optical sensor array 124 may be set to capture the even pixels in the darker region of the document 100. In this case, a portion of the photoelectrons captured by the odd optical sensor array 122 will be lost to the even optical sensor array 124.

To resolve this problem, the formula used for computing the value N'(n,t) for calibrating the photoelectrons captured by the odd optical sensor array is the same formula for calibrating the value N'(n,t) photoelectrons captured by the odd optical sensor array in the aforementioned embodiment, namely, N'(n,t)=N(n,t)−K*[N(n+M,t)−N(n,t)]. However, the value of N(n,t) is higher than N(n+M,t) leading to the amount of photoelectron movement K*[N(n+M,t)−N(n,t)] being a negative number. This further leads to the value N'(n,t) of the quantity of calibrating photoelectrons of the odd pixels captured by the odd optical sensor array higher than the actual value N(n,t) of the quantity of photoelectrons captured.

The formula used for computing the value N'(n,t) for calibrating the photoelectrons captured by the even optical sensor array is the same formula for calibrating the value N'(n,t) photoelectrons captured by the odd optical sensor array in the aforementioned embodiment, namely, N'(n,t)= N(n,t)−K*[N(n−M,t)−N(n,t)]. However, the value of N(n,t) is lower than N(n−M,t) leading to the amount of photoelectron movement K*[N(n−M,t)−N(n,t)] being a positive number. This further leads to the value N'(n,t) of the quantity of calibrating photoelectrons of the even pixels captured by the even optical sensor array lower than the actual value N(n,t) of the quantity of photoelectrons captured.

In the aforementioned method of finding the quantity of calibrating photoelectrons for the odd and even pixels captured by the respective odd and even optical sensor arrays, the $n^{th}$ row of pixels is chosen as a reference position during scanning interval t for the odd and even optical sensor arrays. For example, to carry out a computation in a scanning time interval t for finding the quantity of calibrating photoelectrons in the $n^{th}$ row of odd pixels captured by the odd optical sensor array 122, because the odd and even optical sensor array are separated by M pixels, the even optical sensor array 124 will scan the even pixel of the $(n+M)^{th}$ row during the a scanning interval t. To calculate the quantity of calibration photoelectrons of even pixels in the $n^{th}$ row captured by the even optical sensor array 124, because the odd and even optical sensor array are separated by M pixels, the odd optical sensor array 122 will scan the odd pixel in the $(n-M)^{th}$ row during the scanning interval t.

In the following embodiment, the $n^{th}$ row of pixels serves as a common scanning reference position for the two neighboring optical sensor arrays. Assume the functional value of photoelectrons captured by the odd optical sensor array 122 is N(n,t) due to exposure and the functional value of photoelectrons captured by the even optical sensor array 124 is N(n+M,t) due to exposure. According to the two functions N(n,t) and N(n+M,t), the formula for finding the quantity of calibration photoelectrons captured by the odd optical sensor array 122 is N'(n,t)=N(n,t)−K* [N(n+M,t)−N(n,t)]. Thereafter, the quantity of calibration photoelectrons N'(n,t) is used to correct the brightness value when the $n^{th}$ row of pixels is scanned by the odd optical sensor array 122.

Similarly, according to the two functions N(n,t) and N(n+M,t), the formula for finding the quantity of calibration photoelectrons captured by the even optical sensor array 124 is N'(n+M,t)=N(n+M,t)−K*[N(n,t)−N(n+M,t)]. The quantity of calibration photoelectrons N'(n+M,t) is used to the correct brightness value when the $(n+M)^{th}$ row of pixels is scanned by the even optical sensor array 124.

In conclusion, the present invention provides a method of resolving photoelectron coupling between the two rows of optical sensor arrays inside an optical sensor group of a staggered charge-coupled device. Through relatively simple computation, additional photoelectrons from a neighboring optical sensor array captured by the optical sensor array or photoelectrons originally captured by the optical sensor array but transferred to a neighboring optical sensor array can be sorted out so that the brightness value for an image is corrected. In other words, extra photoelectrons captured by the odd optical sensor array during the scanning of the $n^{th}$ row of pixels can be removed and the quantity of photoelectrons lost from the even optical sensor array during the scanning of $(n+M)^{th}$ row of pixels can be replenished so that brightness value of the image is suitably compensated.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of resolving photoelectron coupling that results from an operation of a staggered charge-coupled device inside a scanner, wherein the staggered charge-coupled device at least includes an optical sensor group comprising of an optical sensor array and a neighboring optical sensor array for scanning pixels, the method comprising the steps of:

recording the quantity of photoelectrons transferred between a first quantity of photoelectrons captured by the optical sensor array and a second quantity of photoelectrons captured by the neighboring optical sensor array during a scanning time interval t; and subtracting the quantity of transferred photoelectrons from the first quantity of photoelectrons captured by the optical sensor array to obtain the correct quantity of photoelectrons captured by the optical sensor array during the scanning time interval t so that correct brightness value for pixels scanned by the optical sensor array is obtained.

2. The method of claim 1, wherein the method of measuring the quantity of transferred photoelectrons comprising the sub-steps:

recording a difference in the quantity of photoelectrons produced due to exposure between the first quantity of photoelectrons captured by the optical sensor array and the second quantity of photoelectrons captured by the neighboring optical sensor array; and multiplying the difference in the quantity of photoelectrons and a photoelectron mobility constant to obtain the quantity of transferred photoelectrons.

3. A method of resolving photoelectron coupling that results from the operation of a staggered charge-coupled device inside a scanner, wherein the staggered charge-coupled device at least includes an optical sensor group comprising of an optical sensor array and a neighboring optical sensor array for scanning pixels, the method comprising the steps of:

registering a functional value N(n,t) for a first quantity of photoelectrons captured by the optical sensor array and a functional value N(n+M,t) for a second quantity of photoelectrons captured by the neighboring optical sensor array during a scanning time interval t, finding the quantity of photoelectrons transferred between the first quantity of photoelectrons and the second quantity of photoelectrons using a formula: K*[N(n+M,t)−N(n, t)], wherein K is a photoelectron mobility constant relating a coupling between the optical sensor array and its neighboring optical sensor array and M is a line difference between the optical sensor array and its neighboring optical sensor array; and using the quantity of transferred photoelectrons between the first quantity of photoelectrons and the second quantity of photoelectrons to obtain a calibrating value N'(n,t) for the quantity of photoelectrons obtained during the scanning time interval t where the calibrating value N'(n,t) is given by a formula: N'(n,t)=N(n, t)−K*[N(n+M,t)−N(n,t)], and using the calibrating value N'(n,t) to correct a brightness value of the pixels scanned by the optical sensor array.

4. A method of resolving photoelectron coupling that results from an operation of a staggered charge-coupled device inside a scanner, wherein the staggered charge-coupled device at least includes an optical sensor group comprising of an optical sensor array and a neighboring optical sensor array for scanning pixels, the method comprising the steps of:

registering a functional value $N(n,t)$ for a first quantity of photoelectrons captured by the optical sensor array and a functional value $N(n-M,t)$ for a second quantity of photoelectrons captured by the neighboring optical sensor array during a scanning time interval t, finding a quantity of photoelectrons transferred between the first quantity of photoelectrons and the second quantity of photoelectrons using a formula: $K*[N(n-M,t)-N(n,t)]$, wherein K is a photoelectron mobility constant relating the coupling between the optical sensor array and its neighboring optical sensor array and M is a line difference between the optical sensor array and its neighboring optical sensor array; and using the quantity of transferred photoelectrons between the first quantity of photoelectrons and the second quantity of photoelectrons to obtain a calibrating value $N'(n,t)$ for the quantity of photoelectrons obtained during the scanning time interval t where the calibrating value $N'(n,t)$ is given by a formula: $N'(n,t)=N(n,t)-K*[N(n-M,t)-N(n,t)]$, and using the calibrating value $N'(n,t)$ to correct a brightness value of the pixels scanned by the optical sensor array.

5. A method of resolving photoelectron coupling that results from an operation of a staggered charge-coupled device inside a scanner, wherein the staggered charge-coupled device at least includes an optical sensor group comprising of an optical sensor array and a neighboring optical sensor array for scanning pixels, the method comprising the steps of:

registering a functional value $N(n,t)$ for a first quantity of photoelectrons captured by the optical sensor array and a functional value $N(n+M,t)$ for a second quantity of photoelectrons captured by the neighboring optical sensor array during a scanning time interval t, finding a first calibrating value $N'(n,t)$ for the photoelectrons captured by the optical sensor array using a formula: $N'(n,t)=N(n,t)-K*[N(n+M,t)-N(n,t)]$, where the first calibrating value $N'(n,t)$ serves to correct a brightness value of the pixels scanned by the optical sensor array; and finding a second calibrating value $N'(n+M,t)$ for the photoelectrons captured by the neighboring optical sensor array using a formula: $N'(n+M,t)=N(n+M,t)-K*[N(n,t)-N(n+M,t)]$, where the second calibrating value $N'(n+M,t)$ serves to correct a brightness value of the pixels scanned by the neighboring optical sensor array;

wherein K is a photoelectron mobility constant relating the coupling between the optical sensor array and its neighboring optical sensor array and M is a line difference between the optical sensor array and its neighboring optical sensor array.

* * * * *